Aug. 9, 1955  G. L. ROBINSON ET AL  2,714,846
TRACTOR ATTACHED IMPLEMENT
Filed Sept. 13, 1949  2 Sheets-Sheet 1

INVENTOR
GARNER LAVERNE ROBINSON
JOHN E. HINDLE
BY
Fetherstonhaugh & Co.
ATTORNEYS Aug. 9, 1955 G. L. ROBINSON ET AL 2,714,846
TRACTOR ATTACHED IMPLEMENT
Filed Sept. 13, 1949 2 Sheets-Sheet 2
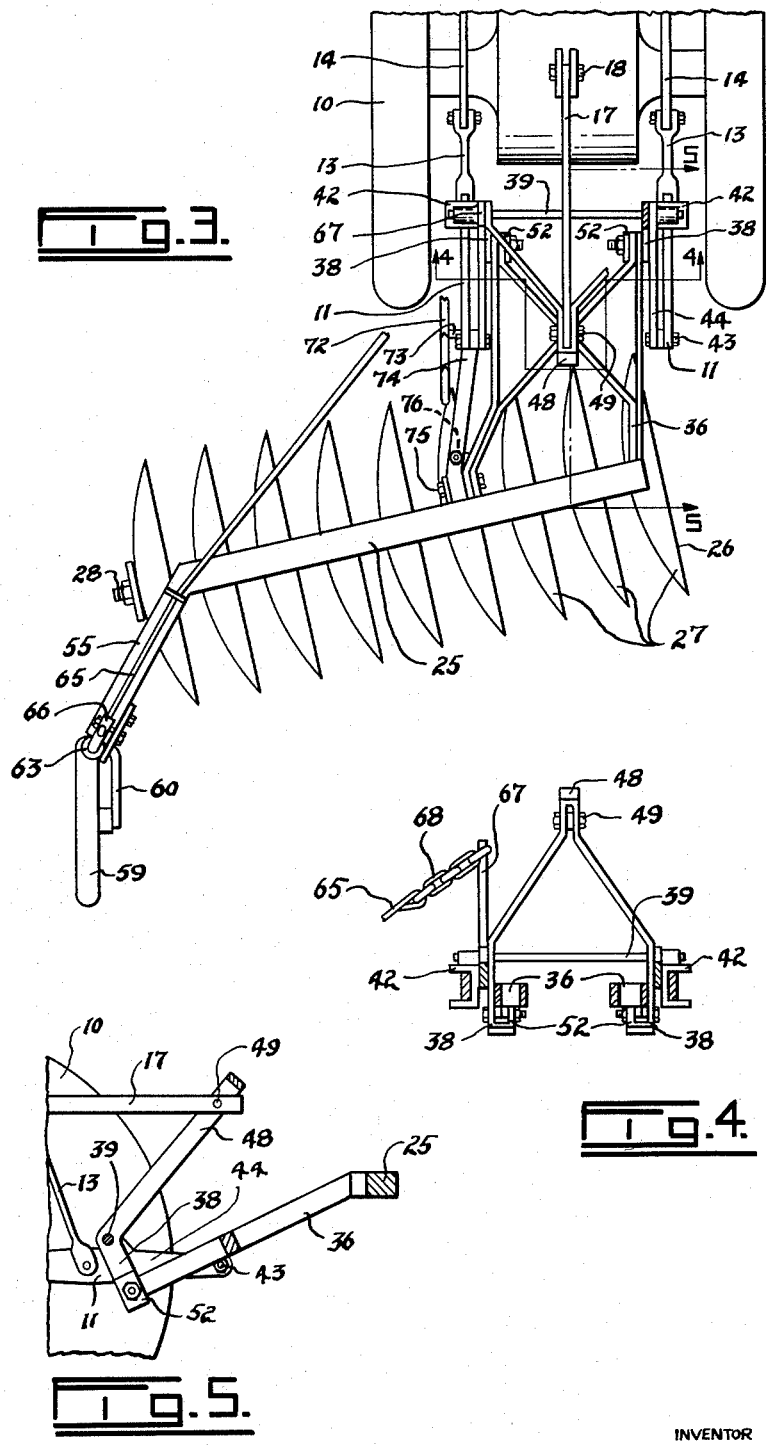
INVENTOR
GARNER LAVERNE ROBINSON
JOHN E. HINDLE
BY
Fetherstonhaugh & Co.
ATTORNEYS United States Patent Office 2,714,846
Patented Aug. 9, 1955

2,714,846

TRACTOR ATTACHED IMPLEMENT

Garner Laverne Robinson, Milner, British Columbia, and John E. Hindle, White Rock, British Columbia, Canada Application September 13, 1949, Serial No. 115,332

3 Claims. (Cl. 97—46.07)

This invention relates to improvements in agricultural apparatus.

At present there are tractors having hydraulically-operated supporting means projecting from the rear thereof for carrying agricultural implements such as plows, side delivery rakes, or the like. One type of supporting means consists of a pair of lifting arms hingedly mounted on the tractor and projecting rearwardly thereof. Suitable hydraulic means is provided for lifting or lowering the other ends of these arms. A central arm is pivotally mounted on the tractor above the lifting arms.

The main purpose of this invention is to provide an agricultural implement including means for connecting it to and supporting it from the supporting means of a tractor.

Another object is the provision of means which will enable the hydraulic supporting means of a tractor to lift and pull a much larger agricultural implement than it was originally designed for.

Another object is the provision of apparatus for transferring some of the pull created by an implement being drawn through the ground to a down pressure on the rear wheels of the tractor pulling it.

A further object is the provision of an agricultural implement which when connected to the supporting means of a tractor, will not tend to lift the front wheels of the latter off the ground when the implement is raised from the ground.

Another object is the provision of an agricultural implement having only a single wheel for assisting in supporting its weight, this wheel being designed not to interfere when the implement is being moved rearwardly.

This apparatus consists of a beam having an agricultural implement, such as a disc plow, side delivery rake, or the like, suspended therefrom. Means is provided for connecting the beam to the hydraulically-operated supporting means of a tractor, and additional means is provided at the rear of the beam for assisting and carrying the weight of the latter. Suitable means is also provided operatively connecting the carrying means to the supporting means for assisting in raising and lowering the beam. The carrying means consists of a wheel mounted for vertical movement in relation to the beam. A cable extends from this wheel to the supporting means, and a bearing mounted on the beam rides on this cable. This cable is connected in such a way that when the supporting means lifts the beam and implement, the wheel is moved downwardly in relation thereto, and when they are dropped by the supporting means, the wheel is moved in the opposite direction.

An example of this invention is illustrated in the accompanying drawings, in which, Figure 1 is a side elevation of a disc plow according to this invention connected to the rear end of a tractor, said plow being in its raised position.

Figure 3 is a plan view of the apparatus shown in Figure 2.

Figure 4 is a section taken on the line 4—4 of Figure 3, and,

Figure 5 is a section taken on the line 5—5 of Figure 3.

Figure 1:
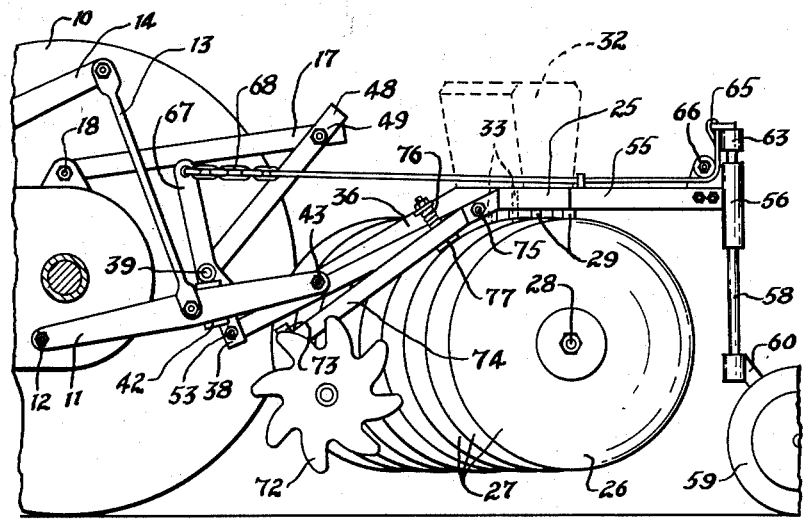
Figure 2:
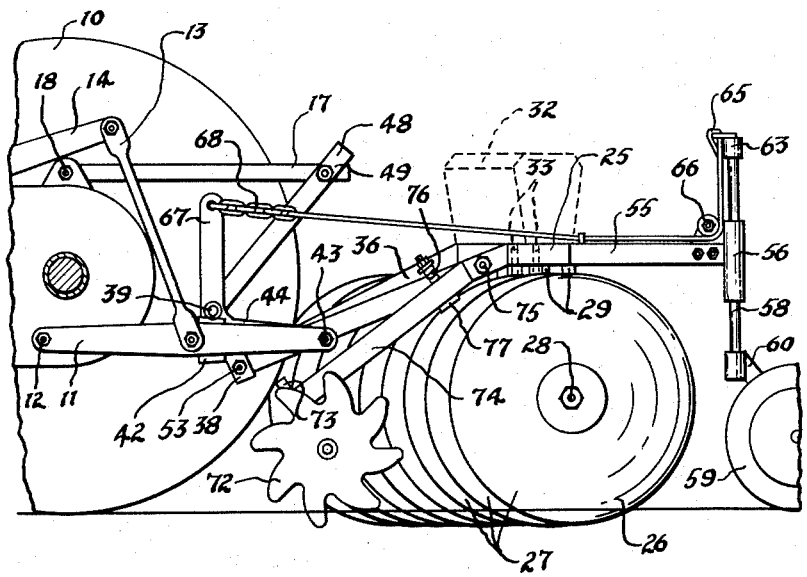
Figure 2 is a similar view to Figure 1 with the plow down in its working position.

Referring to the drawings, 10 is a tractor having a supporting means at the rear thereof consisting of a pair of lifting arms 11 pivotally mounted on the tractor at 12 and extending rearwardly thereof. These arms are connected by links 13 to a hydraulic mechanism 14 which is adapted to lift and lower said arms. A central arm 17 is pivotally mounted on the tractor at 18 above the lifting arms. The equipment described so far is in common use today.

The agricultural apparatus consists of a beam 25 having an agricultural implement suspended therefrom. In this example, the agricultural implement is a disc plow 26 consisting of a plurality of discs 27 mounted on a shaft 28 carried by supports 29 projecting downwardly from the beam. If desired, a seed box 32 may be mounted above the beam, said box having a plurality of spouts 33 extending towards the ground between the discs.

The beam and its implement are preferably positioned at an angle to the longitudinal axis of the tractor to which it is attached. A draw bar 36 fixed to the beam extends forwardly and downwardly therefrom towards the tractor. This draw bar may be of web construction, as clearly shown in Figure 3.

The draw bar 36 is connected to the lifting arms 11 of the tractor in such a way that down pressure is exerted on the rear wheels of the tractor, and any tendency of the front wheels to lift is counteracted. The draw bar is pivotally connected at each side of the forward end thereof to suitable carrying means, such as to ends of brackets 38 which are pivotally mounted at their opposite ends on a transverse shaft 39 which is supported by the lifting arms in any convenient manner. These brackets extend rearwardly and downwardly from the shaft, see Figure 5. In this example, U-shaped brackets 42 fit over each lifting arm adjacent the point where the links 13 are connected thereto, see Figures 1 and 4. As the outer ends of the lifting arms normally have bolts 43 extending therethrough, braces 44 are connected to the outer ends by said bolts and extend forwardly beside the arms to the brackets 42 to which they are connected. These braces constitute a convenient way of connecting the brackets to the lifting arms. The shaft 39 is connected to the brackets 42.

An A-shaped frame 48 is pivotally connected at its apex 49 to the outer end of the central arm 17, and the lower ends of its legs are pivotally mounted on the shaft 39 and connected to the brackets 38 at this point, see Figures 4 and 5.

The outer end of each bracket 38 is bent over to form a lug 52 spaced from the main portion of the bracket. A side of the draw bar 36 fits into the space between the bracket and its lug and is pivotally retained in position by bolt 53. With this arrangement, the rearward end of the draw bar may move upwardly with respect to the brackets 38.

When the lifting arms 11 are raised in the usual manner, the shaft 39 and the brackets 38 move upwardly, thus raising the forward end of the draw bar.

Suitable means is provided behind the beam and the implement for assisting the supporting means of the tractor in lifting said beam and implement. The draw bar 36 is preferably connected to the beam adjacent the end thereof which is nearer the tractor. In this case, a support 55 is connected to the opposite end of the beam and projects rearwardly thereof, preferably at an angle thereto so that its outer end is located beyond the side of the plow. A vertical sleeve 56 is fixed to the outer end of the support 55 and has a shaft 58 rotatably mounted therein and capable of moving vertically therethrough. A ground engaging wheel 59 may be mounted directly on the lower end of this shaft or, as shown, it may be mounted to one side of the lower end by means of a link 60. A cap 63 is secured to the upper end of the shaft 58 above the sleeve 56 in such a way that it can rotate on the shaft but not move up or down with respect to it. A cable 65 is anchored at one end to this cap and extends down and under a bearing 66 carried by the support 55 of the beam and to the upper end of a standard 67 which projects upwardly from one of the brackets 42. The cable is adjustably connected to the standard by means of a chain 68.

When the plow is in the ground, the sleeve 56 is positioned near the lower end of the shaft 58. When the lifting arms 11 are moved upwardly around their pivots 12, the upper end of the standard 67 moves in an arc forwardly towards the tractor. This draws the cable 65 in the same direction and as it is anchored to the cap 63, it tends to straighten out, and thus lifts the beam and its implement. When the plow is in the fully raised position, the sleeve is near but spaced from the cap. With this arrangement, the supporting means of the tractor directly lifts the draw bar 36 at one end of the beam, and through the cable 65, lifts the support 55 to the rear and at the opposite end of the beam. This keeps the implement in its proper vertical and horizontal position when it is being lifted.

When the plow is in the ground and is being drawn by the tractor, the pull is through the lifting arms, brackets 42, shaft 39, brackets 38, and the draw bar to the beam. The pull of the implement on the brackets 38 creates a tendency for these to pivot upwardly around the shaft. This results in the A frame 48 pressing forwardly on the central link 17 which is positioned above the rear axle of the tractor, thus exerting down pressure on the front wheels thereof to counteract any lifting tendency which may exist at the forward end of the tractor.

The weight of the beam and the implement is divided between the supporting means of the tractor and the caster wheel 59. This allows the tractor to carry a much heavier implement than it otherwise could without tending to raise its front wheels when lifting the implement. When the plow is in the ground, the drag tends to pivot the upper portion thereof or the beam forwardly. This exerts a downward pressure on the lifting arms 11, through the sloping draw bar, brackets 38, shaft 39 and the brackets 42. As the lifting arms are mounted on the rear end of the tractor, this action tends to exert a downward pressure on the rear wheels of the tractor, increasing the traction thereof. This enables the tractor to draw a larger implement through the ground than it was originally designed for.

A toothed landside disc 72 is provided at one side of the plow immediately in front of the discs 27. This disc is rotatably mounted on a spindle 73 carried at the outer end of an arm 74, which is pivotally connected at 75 to the draw bar 36. This arm extends downwardly and forwardly from the draw bar and is constantly urged downwardly by a spring 76. A stop 77 carried by the draw bar and extending beneath the arm 74 limits the downward movement of the latter.

When the plow is in use, the landside disc 72 resists the tendency of the plow to swerve out of line with the tractor. As the tractor moves forwardly, the teeth of the disc bite into the ground. Once the disc is in the ground, the pull of the tractor and the pivotal mounting of the arm 74 forces it to a desired depth. If it strikes a hard object, the arm 74 pivots upwardly against the pressure of the spring 76 to allow the disc to ride over it.

The depth to which the plow penetrates into the ground is controlled by the hydraulic mechanism of the tractor. The lever 67 moves the end of the cable forwardly or rearwardly as the plow is being lifted or lowered so that said plow is always maintained in its correct position regardless of the depth at which it is working. When the apparatus is being fitted and adjusted to a tractor, the length of the cable is adjusted by the chain links 68 to position and maintain the apparatus in its correct horizontal and vertical planes.

What we claim as our invention is:

1. Agricultural apparatus adapted to be mounted on a tractor having hydraulically-operated supporting means projecting from the rear thereof, which comprises a beam, an implement suspended from the beam, a draw bar connecting the beam to the supporting means of a tractor, a substantially vertical sleeve connected to the beam, a shaft movably mounted in the sleeve, a ground engaging wheel rotatably mounted on the lower end of the shaft, a cable connected to the upper end of the shaft and to the tractor supporting means, and a bearing carried by the beam and riding on the cable, whereby the shaft and wheel are moved downwardly and upwardly relative to the frame as the latter is raised and lowered by the supporting means.

2. Agricultural apparatus adapted to be mounted on a tractor having hydraulically-operated supporting means projecting from the rear thereof, which comprises a beam, an implement suspended from the beam, a draw bar connecting the beam to the supporting means of a tractor, a substantially vertical sleeve connected to the beam, a shaft movably mounted in the sleeve, a ground engaging wheel rotatably mounted on the lower end of the shaft, a standard rigidly mounted on the tractor supporting means, the outer end of said standard moving towards the tractor when the supporting means is raised, a cable connected to the upper end of the shaft, and the outer end of the standard, and a bearing carried by the beam and riding on the cable, whereby the shaft and wheel are moved downwardly and upwardly relative to the frame as the latter is raised and lowered by the supporting means.

3. Agricultural apparatus adapted to be mounted on a tractor having supporting means consisting of a pair of hydraulically-operated lifting arms projecting rearwardly therefrom and a central arm pivotally mounted thereon above said arms, which comprises a beam, an implement suspended from the beam, carrying means pivotally connected to the lifting arms and extending downwardly therefrom, a draw bar extending from the beam and pivotally connected to the carrying means below the lifting arms, an arm connected to the carrying means at the pivot thereof and to the central arm of the tractor for exerting pressure against the upper part of the tractor when the implement is being drawn through the ground, a substantially vertical sleeve connected to the beam, a shaft movably mounted in the sleeve, a ground engaging wheel rotatably mounted on the lower end of the shaft, a standard rigidly mounted on and extending upwardly from one of the lifting arms, a cable connected to the upper end of the shaft and the upper end of the standard, and a bearing carried by the beam near the rearward end thereof and riding on the cable whereby the shaft and wheel are moved downwardly and upwardly relative to the beam as the lifting arms are raised and lowered.

References Cited in the file of this patent

UNITED STATES PATENTS

| | | |
|---|---|---|
| 1,637,811 | Ferguson | Aug. 2, 1927 |
| 2,098,472 | Strandlund | Nov. 9, 1937 |
| 2,320,141 | Kott | May 25, 1943 |
| 2,386,378 | Wippel | Oct. 9, 1945 |
| 2,398,991 | Arps | Apr. 23, 1946 |
| 2,608,145 | Knapp | Aug. 26, 1952 |

FOREIGN PATENTS

| | | |
|---|---|---|
| 497,155 | Germany | May 3, 1930 |
| 608,884 | Great Britain | Sept. 22, 1948 |